United States Patent
Son

(10) Patent No.: US 8,045,130 B2
(45) Date of Patent: Oct. 25, 2011

(54) RUBBING METHOD, METHOD OF FABRICATING LIQUID CRYSTAL DISPLAY DEVICE USING THE SAME, AND LIQUID CRYSTAL DISPLAY DEVICE MANUFACTURED THEREBY

(75) Inventor: Kyung Mo Son, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 462 days.

(21) Appl. No.: 12/289,900

(22) Filed: Nov. 6, 2008

(65) Prior Publication Data

US 2009/0128763 A1    May 21, 2009

(30) Foreign Application Priority Data

Nov. 8, 2007  (KR) .................. 10-2007-0113844

(51) Int. Cl.
*G02F 1/13* (2006.01)
*G02F 1/1337* (2006.01)
(52) U.S. Cl. ........................ 349/187; 349/126
(58) Field of Classification Search .............. 349/126, 349/187
See application file for complete search history.

(56) References Cited

FOREIGN PATENT DOCUMENTS

| JP | 10-197868 | 7/1998 |
|----|-----------|--------|
| JP | 2001-305552 | 10/2001 |

*Primary Examiner* — Mark Robinson
*Assistant Examiner* — Michael Inadomi
(74) *Attorney, Agent, or Firm* — Morgan, Lewis & Bockius LLP

(57) ABSTRACT

A liquid crystal display device capable of reducing a disclination region generated when an alignment layer is not normally rubbed due to physical interference between a pattern spacer formed on a substrate and fibers of a rubbing cloth in a rubbing process and a rubbing and fabricating method thereof are disclosed. The liquid crystal display device includes a liquid crystal panel having two bonded substrates with a liquid crystal layer interposed therebetween, alignment layers formed on the two substrates to align liquid crystal molecules in a predetermined direction, and a pattern spacer formed on any one substrate to maintain a distance between the substrates. The alignment layers are rubbed by a rubbing cloth having fibers inclined in a left or right direction with respect to a perpendicular direction of a rotation shaft of a rubbing roll, and the pattern spacer has an inclined surface parallel to the fibers.

5 Claims, 13 Drawing Sheets

(I)

(II)

(III)

RUBBING METHOD, METHOD OF FABRICATING LIQUID CRYSTAL DISPLAY DEVICE USING THE SAME, AND LIQUID CRYSTAL DISPLAY DEVICE MANUFACTURED THEREBY

CROSS-REFERENCE TO RELATED APPLICATION

This application claims the benefit of Korean Patent Application No. 10-2007-113844, filed on Nov. 8, 2007, which is hereby incorporated by reference in its entirety as if fully set forth herein.

BACKGROUND OF THE INVENTION

1. Field of the Invention

The present invention relates to a method of rubbing an alignment layer of a liquid crystal display device capable of solving a problem that the alignment layer is not normally rubbed due to interference between a pattern spacer formed on a substrate and a rubbing cloth in a rubbing process.

2. Discussion of the Related Art

The present invention relates to a rubbing method, and more particularly to a rubbing method capable of minimizing interference between a pattern spacer formed on a substrate and a rubbing cloth in a rubbing process.

Further, the present invention relates to a rubbing method, and more particularly to a method of fabricating a liquid crystal display device using the rubbing method and a liquid crystal display device formed thereby. An object of the present invention is to provide a liquid crystal display device capable of improving display quality by reducing a disclination region generated by height difference of the pattern spacer and a method of fabricating the same.

As an information-oriented society has been developed, various flat panel display devices are widely used instead of conventional cathode ray tube (CRT) to display visual information.

The flat panel display devices include a plasma display panel (PDP), a field emission display device (FED), a liquid crystal display device (LCD), an organic light emitting diode (OLED) and the like. Among those flat panel display devices, the LCD, which is widely used in various fields such as display screens of a mobile phone and a computer monitor and a display screen of a large-sized TV, is the most representative flat panel display device.

The liquid crystal display device produces an image using liquid crystal molecules having an intermediate property between a liquid phase having fluidity and a solid phase having a crystal state.

That is, the LCD produces a desired image by varying an alignment direction of the liquid crystal molecules according to the electric field to adjust light transmittance using anisotropy of the liquid crystal molecules in which an optical property and a dielectric constant are different according to minor and major axes.

Hereinafter, a conventional liquid crystal display device will be described in detail.

The conventional liquid crystal display device includes a liquid crystal panel formed of two substrates facing each other and bonded to each other while a liquid crystal layer is interposed therebetween.

The two substrates may include, for example, a color filter substrate and a thin film transistor substrate. A distance between the two substrates is maintained by a pattern spacer.

In a case shown in FIG. 1A, the pattern spacer is formed on the color filter substrate.

As shown in FIG. 1A, a substrate 100 includes a black matrix 110 arranged in a matrix on the substrate 100 to define pixel regions and color filters 120 formed on the pixel regions.

The pattern spacer is spaced from a neighboring pattern spacer of the black matrix by a specific distance.

The black matrix serves to prevent light from being transmitted through a region excluding the pixel regions in which the liquid crystal is normally operated. The black matrix may be formed of metal such as chromium or a double film of a chromium/chromium oxide film. Also, the black matrix may be formed of polymeric resin.

The pattern spacer may be formed of, for example, negative photoresist. As shown in FIG. 1B, the pattern spacer is formed in a circular, octagonal, or square shape.

Meanwhile, the liquid crystal molecules should be aligned in a predetermined direction to normally operate the liquid crystal interposed between the two substrates.

For this, after alignment layers are formed on the two substrates, a rubbing process is performed on the alignment layers to align the liquid crystal molecules.

FIG. 2 illustrates a rubbing process.

As shown in FIG. 2, a rubbing roll 310 wrapped with a rubbing cloth 330 is rotated around a central shaft 320. While the rubbing roll moves toward a substrate having an alignment layer (not shown), fibers 340 implanted into the rubbing cloth are in contact with the alignment layer to perform a rubbing process.

That is, the fibers of the rubbing cloth form microgrooves in the alignment layer. Side chains extended from a polymeric main chain forming the alignment layer are arranged in one direction along the microgrooves. The liquid crystal molecules are arranged in one direction along the side chains of the alignment layer.

Further, the substrate may move toward the rubbing roll without movement of the rubbing roll. The rubbing roll and the substrate may move simultaneously to perform a rubbing process.

However, during the rubbing process, the patterns having height difference formed on the substrate physically interfere with the fibers of the rubbing cloth. The physical interference causes difficulty when the alignment layer aligns the liquid crystal molecules.

When there is physical interference between the rubbing cloth and the various patterns, the alignment layer is not sufficiently rubbed, thereby reducing an alignment capability of the alignment layer which aligns the liquid crystal molecules. Accordingly, a disclination region, in which the liquid crystal is not normally operated, increases to reduce a contrast ratio.

FIGS. 3A to 3C are photographs obtained by observing a color filter substrate using a polarization microscope after a liquid crystal panel including a color filter substrate and a thin film transistor array substrate is completed and divided.

As shown in FIGS. 3A to 3C, in a region where the rubbing process is normally performed, the liquid crystal molecules are normally aligned to maintain a full black state. On the other hand, in a region where the rubbing process is not normally performed, the liquid crystal molecules may be not normally aligned as indicated by circles.

The region where the rubbing process is not normally performed seems to be brighter than other regions on the black screen due to a light leakage phenomenon.

Particularly, among various patterns having height difference, the pattern spacer for maintaining a cell gap between two substrates is relatively higher than other patterns. Accordingly, the interference between the pattern spacer and the rubbing cloth becomes a main factor which reduces an alignment capability of the alignment layer.

SUMMARY OF THE INVENTION

Accordingly, the present invention is directed to a metal pad of a semiconductor device that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a rubbing method comprises: loading a substrate having an alignment layer on a stage; and rubbing the substrate using a rubbing cloth having fibers inclined in only one direction of left and right directions with respect to a perpendicular direction of a rotation shaft of a rubbing roll, wherein the substrate includes a pattern spacer inclined in a direction parallel to an inclined direction of the fibers.

In another aspect of the present invention, a method of fabricating a liquid crystal display device comprises: preparing a first substrate and a second substrate; forming alignment layers on the first and second substrates; rubbing the alignment layers using a rubbing cloth having fibers inclined in only one direction of left and right directions with respect to a perpendicular direction of a rotation shaft of a rubbing roll; and bonding the first and second substrates while a liquid crystal layer is interposed between the substrates, wherein at least one substrate of the first and second substrates includes a pattern spacer having an inclined surface parallel to the fibers.

In a further aspect of the present invention, a liquid crystal display device comprises: a liquid crystal panel having two substrates facing each other and, bonded to each other while a liquid crystal layer is interposed therebetween; alignment layers respectively formed on the two substrates to align liquid crystal molecules of the liquid crystal layer in a predetermined direction; and a pattern spacer formed on any one substrate of the two substrates to maintain a distance between the two substrates, wherein the alignment layers are rubbed by a rubbing cloth having fibers inclined in only one direction of left and right directions with respect to a perpendicular direction of a rotation shaft of a rubbing roll, and wherein the pattern spacer is formed to have an inclined surface parallel to the fibers.

The liquid crystal display device according to the present invention offers an effect of minimizing a disclination region by reducing the interference between the pattern spacer formed on the substrate and the fibers of the rubbing cloth in the rubbing process.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, an embodiment of the present invention will be described in detail.

First, a rubbing method according to the embodiment of the present invention includes loading a substrate having an alignment layer on a stage, rotating a rubbing roll wrapped with a rubbing cloth having fibers inclined in a left or right direction with respect to a perpendicular direction of a rotation shaft, and rubbing the alignment layer while moving at least one of the rubbing cloth and the substrate.

The substrate includes a pattern spacer formed to be inclined in a direction parallel to an inclined direction of the fibers of the cloth.

Next, the rubbing method according to the embodiment of the present invention will be described in detail with reference to FIGS. 4A and 4B.

Figure 1A:
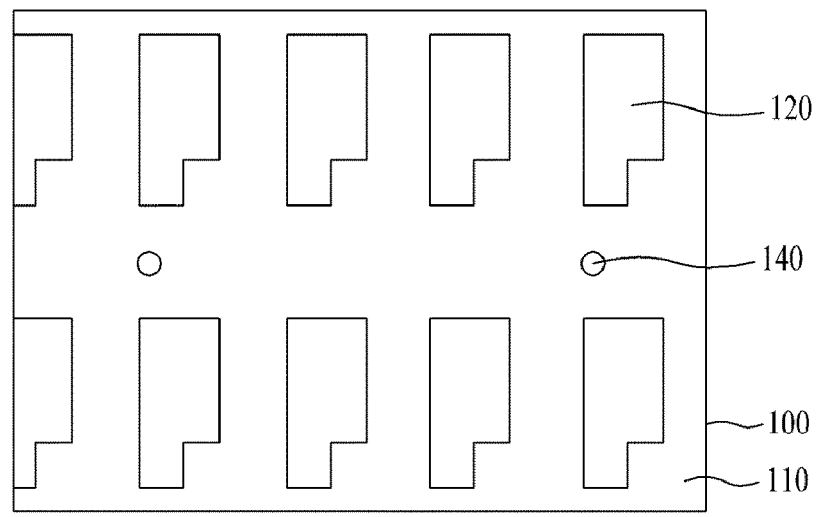
FIG. 1A illustrates a plan view of a conventional color filter substrate.
Figure 1B:
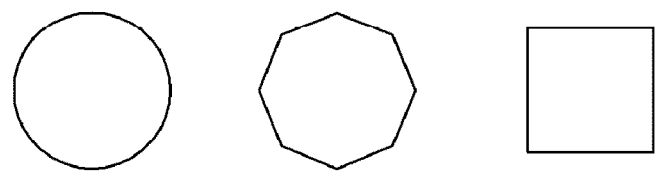
FIG. 1B illustrates a conventional pattern spacer.
Figure 2:
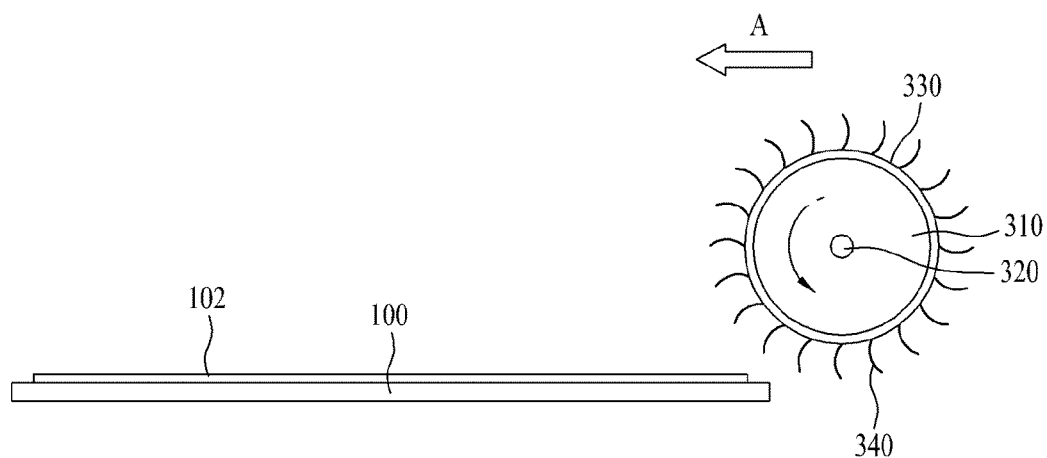
FIG. 2 illustrates a conventional rubbing method.
Figure 3A:
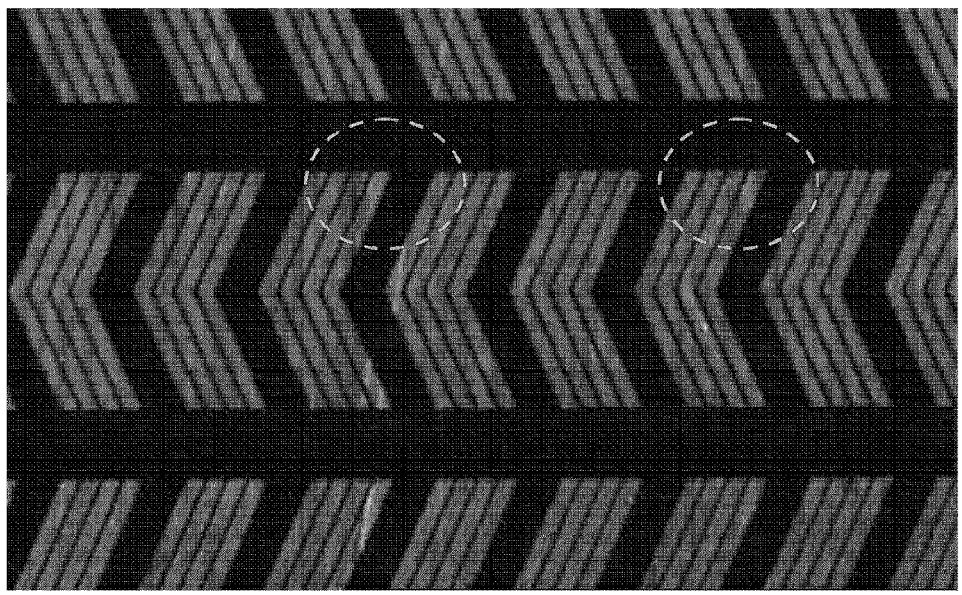
FIGS. 3A to 3C show the problems of the conventional rubbing method.
Figure 3B:
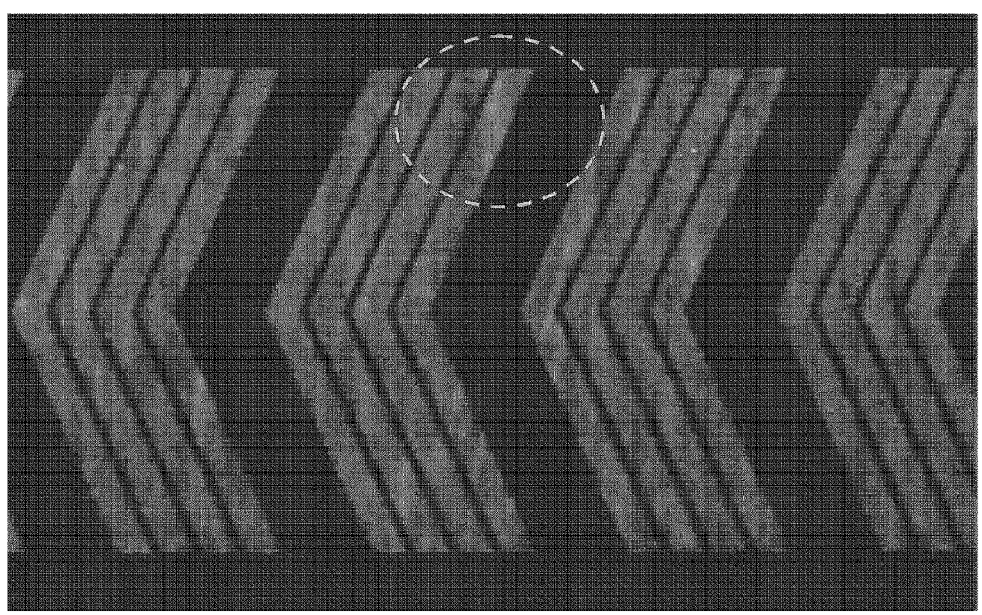
Figure 3C:
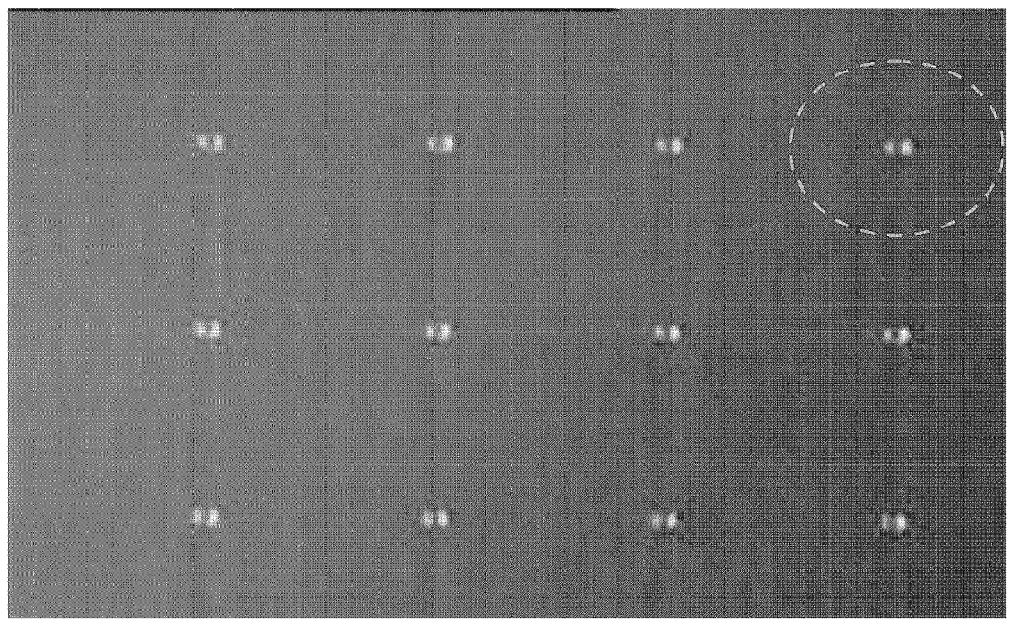
Figure 4A:
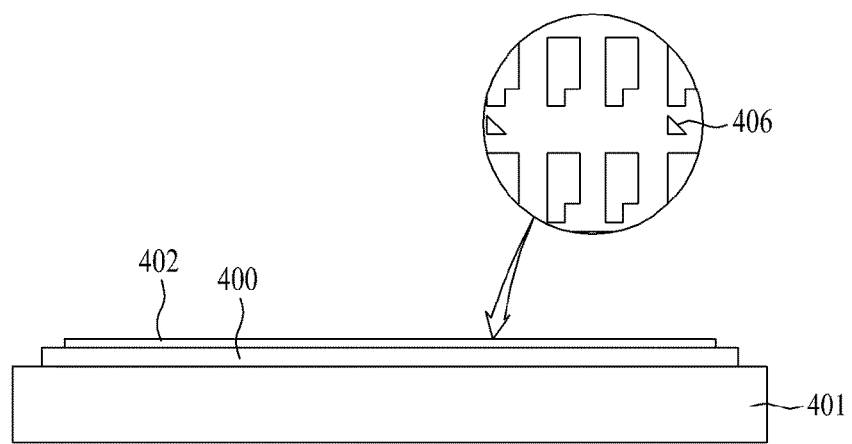
FIGS. 4A and 4B illustrate a rubbing method according to an embodiment of the present invention.

First, as shown in FIG. 4A, a substrate 400 having an alignment layer 402 is loaded on a stage 401.

In this case, the substrate 400 includes a pattern spacer 406 having an inclined surface, and the alignment layer is formed to cover the entire surface of the substrate including the pattern spacer 406.

Figure 4B:
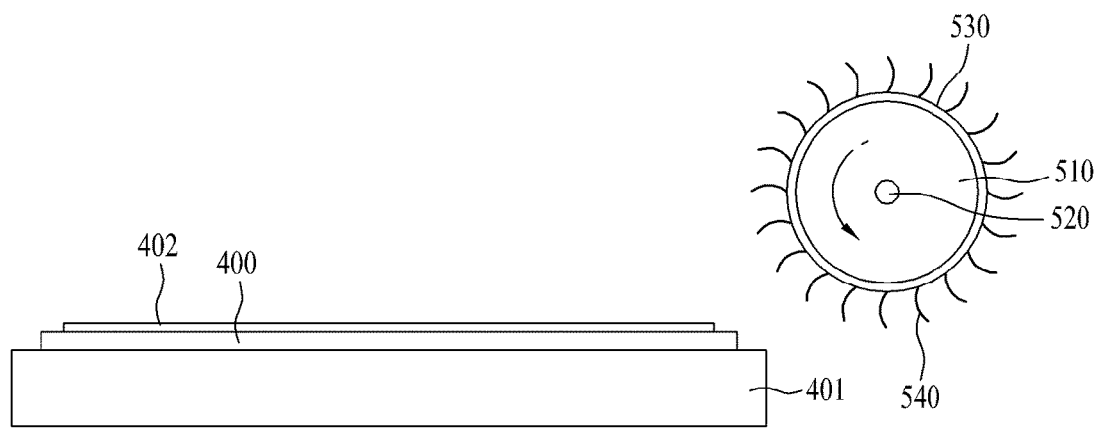

Then, as shown in FIG. 4B, a rubbing roll 510 wrapped with a rubbing cloth 530 is rotated, and a rubbing process is performed on the alignment layer while moving at least one of the substrate 400 having the pattern spacer 406 and the rubbing roll 510.

In this case, the fibers implanted into the rubbing cloth 530 are inclined in only one direction of the left and right directions with respect to a perpendicular direction of a rotation shaft 520 of the rubbing roll 510.

Further, preferably, the fibers are inclined at an angle of 5° to 37°.

Further, while the fibers are inclined in only one direction of the left and right direction with respect to the perpendicular direction of the rotation shaft 520 of the rubbing roll 510, the fibers may be inclined in a direction opposite to the rubbing direction.

As described above, when the fibers are inclined in a direction opposite to the rubbing direction, it is possible to reduce scratches in the rubbing process.

Further, the pattern spacer 406 is formed to have an inclined surface substantially parallel to the fibers.

Figure 5A:
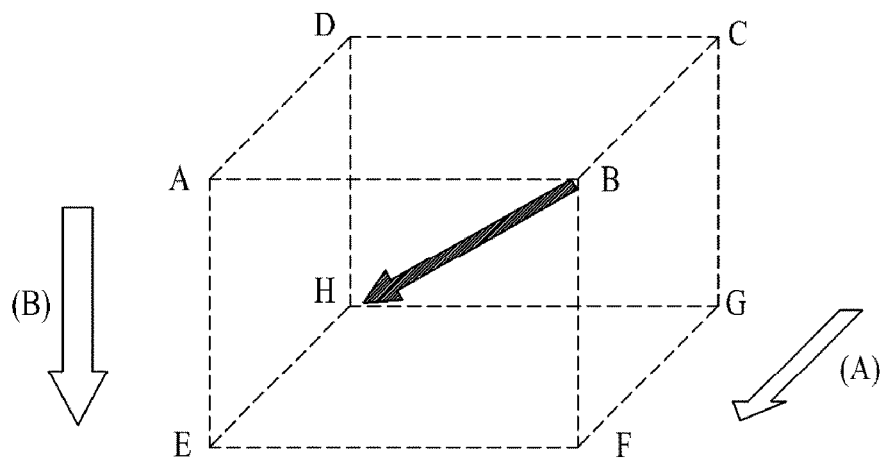
FIG. 5A illustrates an L-type rubbing cloth.
Figure 5B:
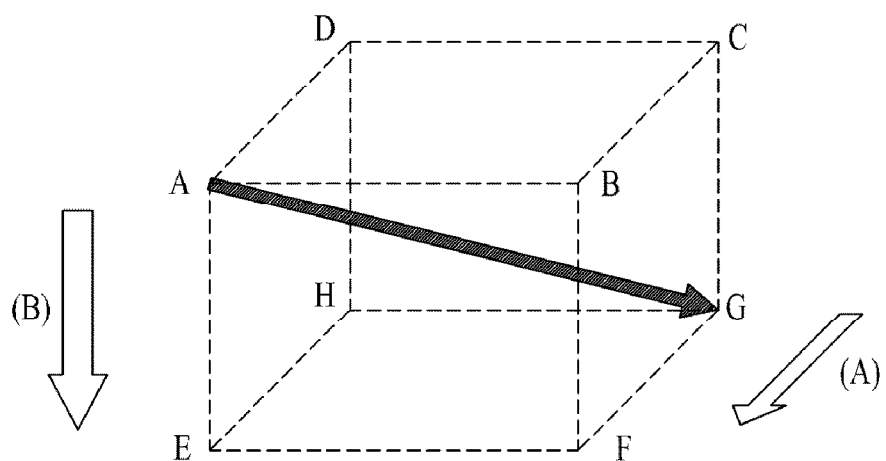
FIG. 5B illustrates an R-type rubbing cloth.

FIG. 5A illustrates a case in which the fibers are inclined in the left direction with respect to the perpendicular direction of the rotation shaft. FIG. 5B illustrates a case in which the fibers are inclined in the right direction with respect to the perpendicular direction of the rotation shaft.

In both cases, the fibers are inclined in the direction opposite to the rubbing direction.

First, in the case shown in FIG. 5A, a vector BH indicates a fiber, and a plane ABCD and a plane EFGH indicate a rubbing cloth 530 and a substrate 400, respectively. Further, an arrow (A) indicates a rubbing direction.

That is, in the case shown in FIG. 5A, the fiber has a vector component inclined in the direction opposite to the rubbing direction (A), and also has a vector component inclined in the left direction with respect to a perpendicular direction (B) of the rotation shaft 520, which is parallel to a vector BF. A rubbing cloth 530 corresponding to FIG. 5A is referred to as an L-type rubbing cloth.

In the case shown in FIG. 5B, a vector AG indicates a fiber, and a plane ABCD and a plane EFGH indicate a rubbing cloth 530 and a substrate 400, respectively. Further, an arrow (A) indicates a rubbing direction.

That is, in the case shown in FIG. 5B, the fiber has a vector component inclined in the direction opposite to the rubbing direction (A), and also has a vector component inclined in the right direction with respect to a perpendicular direction (B) of the rotation shaft 520, which is parallel to a vector BF. A rubbing cloth 530 corresponding to FIG. 5B is referred to as an R-type rubbing cloth.

A rubbing process using the L-type and R-type rubbing cloths 530 is described in detail with reference to FIGS. 6A and 6B.

Figure 6A:
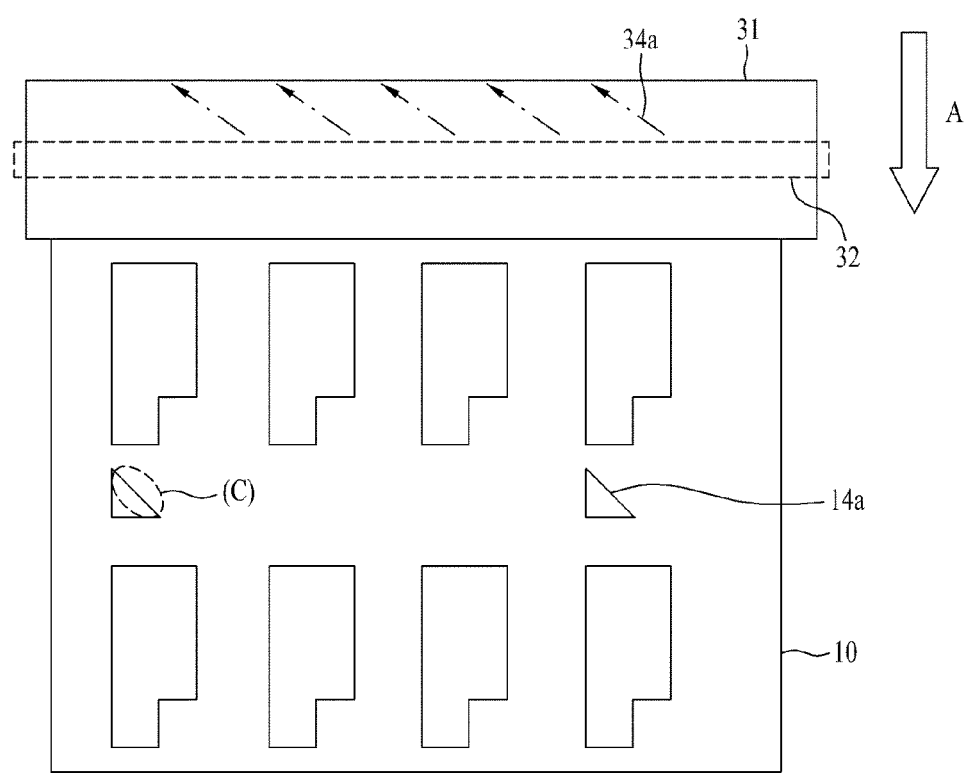
FIG. 6A illustrates a plan view of the substrate rubbed by the L-type rubbing cloth.

That is, as shown in FIG. 6A, a rubbing process using the L-type rubbing cloth is performed in a rubbing direction A using a rubbing cloth 31 having fibers 34a inclined in the left direction with respect to a perpendicular direction of a rotation shaft 32 of the rubbing roll. In this case, a substrate 10 includes a pattern spacer 14a having an inclined surface (C) parallel to the fibers inclined in the left direction with respect to the perpendicular direction of the rotation shaft 32 of the rubbing roll.

For reference, in the fibers 34a in contact with the substrate 10, an arrowhead indicates a portion of the fiber 34a in contact with the substrate 10, and a portion opposite to the arrowhead indicates a portion of the fiber 34a implanted into the rubbing cloth 31.

Figure 6B:
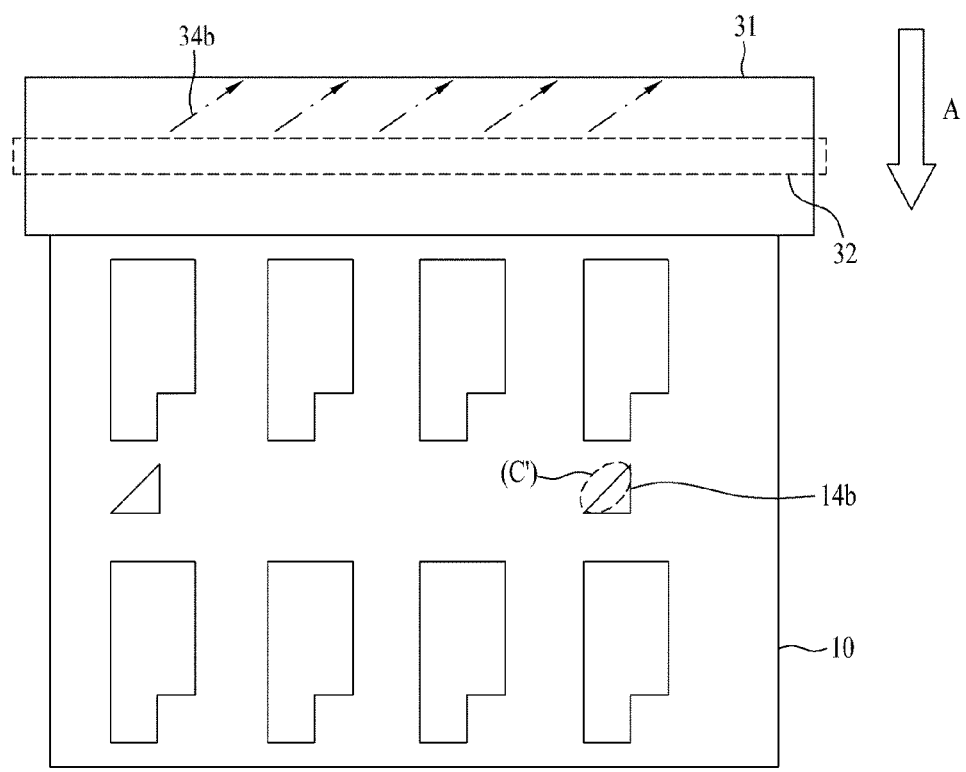
FIG. 6B illustrates a plan view of the substrate rubbed by the R-type rubbing cloth.

As shown in FIG. 6B, a rubbing process using the R-type rubbing cloth is performed in a rubbing direction A using a rubbing cloth 31 having fibers 34b inclined in the right direction with respect to the perpendicular direction of the rotation shaft 32 of the rubbing roll. In this case, the substrate 10 includes a pattern spacer 14b having an inclined surface (C') parallel to the fibers 34b inclined in the right direction with respect to the perpendicular direction of the rotation shaft 32 of the rubbing roll.

For reference, in the fibers 34b in contact with the substrate 10, an arrowhead indicates a portion of the fiber 34b in contact with the substrate 10, and a portion opposite to the arrowhead indicates a portion of the fiber 34b implanted into the rubbing cloth 31.

Hereinafter, a method for fabricating a liquid crystal display device according to the embodiment of the present invention will be described.

The method for fabricating a liquid crystal display device according to the embodiment of the present invention includes preparing a first substrate and a second substrate, forming alignment layers on the two substrates, rubbing the alignment layers using a rubbing roll wrapped with a rubbing cloth having fibers inclined in only one direction of left and right directions with respect to a perpendicular direction of a rotation shaft of the rubbing roll, and bonding the two substrates while a liquid crystal layer is interposed between the two substrates.

At least one substrate of the two substrates includes a pattern spacer formed to have an inclined surface parallel to the fibers.

Figure 7:
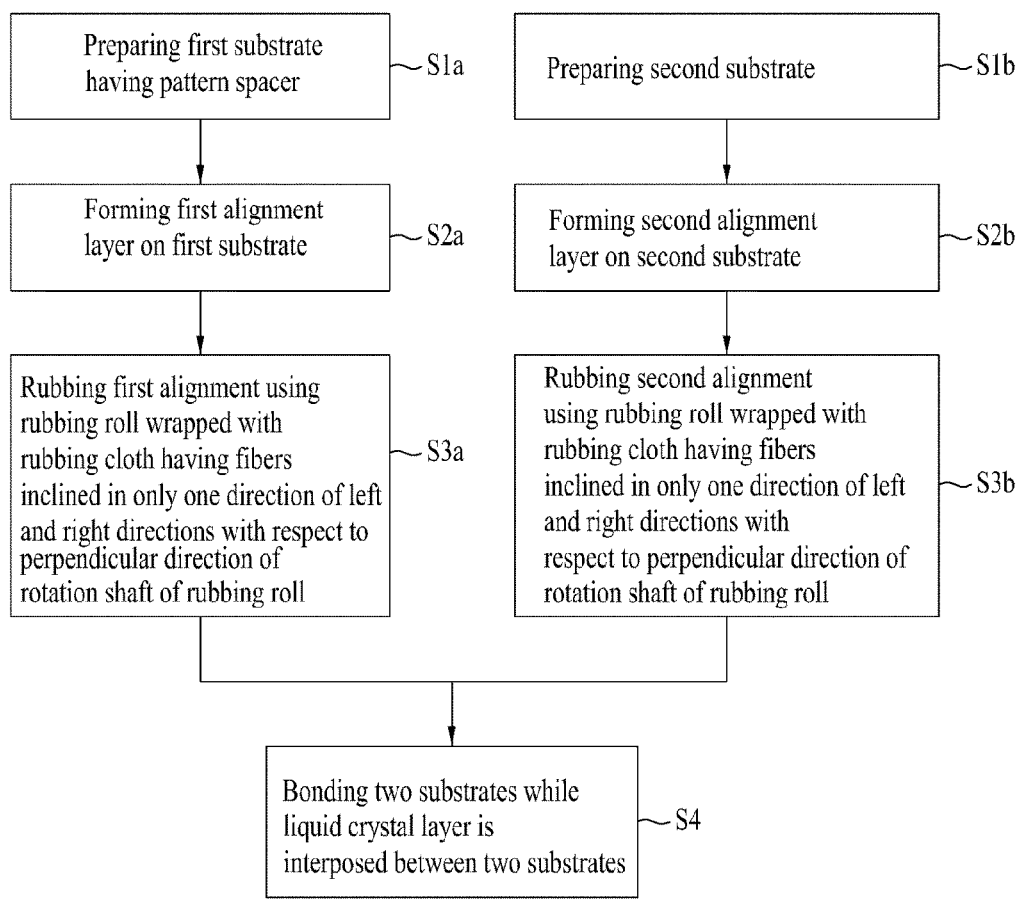
FIG. 7 illustrates a flowchart showing a method for fabricating a liquid crystal display device according to the embodiment of the present invention.

FIG. 7 illustrates a flowchart showing the method for fabricating a liquid crystal display device according to the embodiment of the present invention.

As shown in FIG. 7, in steps S1a and S1b of preparing the first substrate having the pattern spacer and the second substrate, respectively, the two substrates may be, for example, a color filter substrate and a thin film transistor array substrate.

Preferably, the pattern spacer is formed oh the color filter substrate.

Further, the pattern spacer is formed to have an inclined surface parallel to the fibers of the rubbing cloth used in the following rubbing step.

Then, in steps S2a and S2b of forming alignment layers on the two substrates, an alignment material, for example, polyamic acid and soluble polyimide, is coated on each substrate. After the alignment material is dried at a temperature of 60° C. to 80° C., the alignment material is sintered at a temperature of 80° C. to 200° C. and is converted into a polyimide to form the alignment layer.

Then, in steps S3a and S3b of rubbing the alignment layers using a rubbing roll wrapped with a rubbing cloth having fibers inclined in only one direction of the left and right directions with respect to the perpendicular direction of the rotation shaft of the rubbing roll, a rubbing process is performed on the alignment layers formed on the substrates through the above steps in order to align liquid crystal molecules in a predetermined direction.

The rubbing cloth wrapping the rubbing roll includes the fibers inclined in only one direction of the left and right directions with respect to the perpendicular direction of the rotation shaft of the rubbing roll.

Further, preferably, both the primary and secondary rubbing processes are performed in a forward direction. That is, when the substrate and the rubbing roll are in contact with each other, the rotation of the rubbing roll and the movement of the substrate are performed in the same direction.

Further, the pattern spacer formed on the substrate is formed to have an inclined surface parallel to the fibers.

Then, in step S4 of bonding the two substrates while a liquid crystal layer is interposed between the two substrates, after the liquid crystal is loaded on any one substrate of the two substrates and a sealing material is coated on the other substrate, the two substrates may be bonded to each other.

In another way, the two substrates are bonded to each other to have a liquid crystal injection port. Then, after the liquid crystal is injected into a space between the two substrates through the liquid crystal injection port, the liquid crystal injection port may be sealed.

That is, the method for fabricating the liquid crystal display device according to the embodiment of the present invention is characterized by that the rubbing process is performed on the alignment layer provided in the liquid crystal display device using a rubbing cloth having fibers inclined in only one direction of the left and right directions with respect to the perpendicular direction of the rotation shaft of the rubbing roll, and the pattern spacer formed on the liquid crystal display device is formed to have an inclined surface parallel to the fibers of the rubbing cloth.

Accordingly, it is possible to minimize interference between the pattern spacer and the fibers of the rubbing cloth in the rubbing process.

Hereinafter, the liquid crystal display device according to the embodiment of the present invention is described.

The liquid crystal display device according to the embodiment of the present invention includes a liquid crystal panel having two substrates facing each other and bonded to each other while a liquid crystal layer is interposed therebetween, alignment layers respectively formed on the two substrates to align the liquid crystal molecules of the liquid crystal layer in a predetermined direction, and a pattern spacer formed on any one substrate of the two substrates to maintain a distance between the two substrates.

The alignment layers are rubbed by the rubbing cloth having the fibers inclined in only one direction of the left and right directions with respect to the perpendicular direction of the rotation shaft of the rubbing roll. Further, the pattern spacer is formed to have an inclined surface parallel to the fibers.

Figure 8:
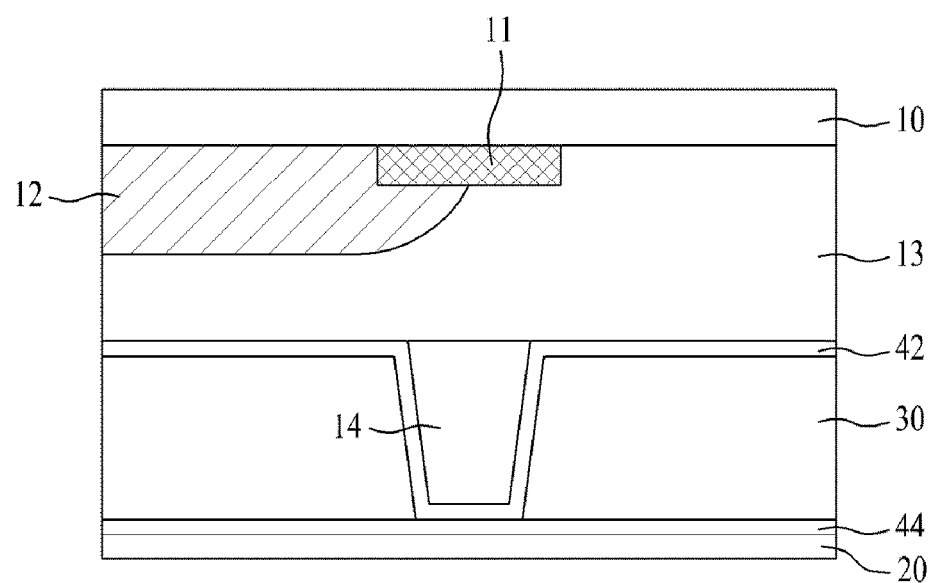
FIG. 8 illustrates a cross-sectional view showing essential parts of a liquid crystal display device according to the embodiment of the present invention.

FIG. 8 illustrates a cross-sectional view of the liquid crystal display device according to the embodiment of the present invention.

As shown in FIG. 8, the liquid crystal display device according to the embodiment of the present invention includes a liquid crystal panel having a first substrate 10 and a second substrate 20 facing each other and bonded to each other while a liquid crystal layer 30 is interposed therebetween, a first alignment layer 42 formed on the first substrate 10 and a second alignment layer 44 formed on the second substrate 20, and a pattern spacer 14 formed on the first substrate 10.

The first alignment layer 42 and the second alignment layer 44 are rubbed by the rubbing cloth having the fibers inclined in only one direction of the left and right directions with respect to the perpendicular direction of the rotation shaft of the rubbing roll.

Further, the pattern spacer 14 is formed to have an inclined surface parallel to the fibers. Further, the pattern spacer 14 may be formed of, for example, a photosensitive organic material such as a photoresist.

The first substrate 10 and the second substrate 20 may be, for example, a color filter substrate and a thin film transistor array substrate.

The color filter substrate includes a black matrix 11 formed on the substrate to define pixel regions arranged in a matrix and prevent light transmission, and color filters 12 formed in the pixel regions. If necessary, the color filter substrate may further include an overcoat layer 13 formed to cover the black matrix and the color filters.

Although not shown in the drawings, the thin film transistor substrate includes gate lines and data lines formed on the substrate to cross each other and define the pixel regions, thin film transistors formed at crossing portions of the gate lines and the data lines, and pixel electrodes formed in the pixel regions to be connected to the thin film transistors.

Further, the pattern spacer 14 is formed on any one substrate, preferably, a color filter substrate, of the two substrates to maintain a distance between the two substrates.

The liquid crystal layer 30 is sealed by a sealing material (not shown) formed in a boundary region of the liquid crystal panel.

The first alignment layer 42 and the second alignment layer 44 align the liquid crystal molecules of the liquid crystal layer in a predetermined direction through a rubbing process after the alignment material coated on the first substrate and the second substrate is hardened.

The alignment material is formed of polyamic acid, polyimide, an organic solvent or the like, and is sintered by heat. Particularly, the alignment layer formed on the substrate having the pattern spacer is formed to cover the pattern spacer.

Further, the alignment layer is rubbed by the rubbing cloth having the fibers inclined in only one direction of the left and right directions with respect to the perpendicular direction of the rotation shaft of the rubbing roll.

Further, the pattern spacer is formed to have an inclined surface parallel to the fibers.

That is, the liquid crystal display device according to the embodiment of the present invention includes the alignment layer rubbed by the rubbing cloth having the fibers inclined in only one direction of the left and right directions with respect to the perpendicular direction of the rotation shaft of the rubbing roll, and the pattern spacer having an inclined surface parallel to the fibers of the rubbing cloth.

Accordingly, it is possible to minimize the interference between the pattern spacer and the fibers of the rubbing cloth in the rubbing process, thereby minimizing a disclination region in which the liquid crystal molecules are not normally aligned.

Figure 9A:
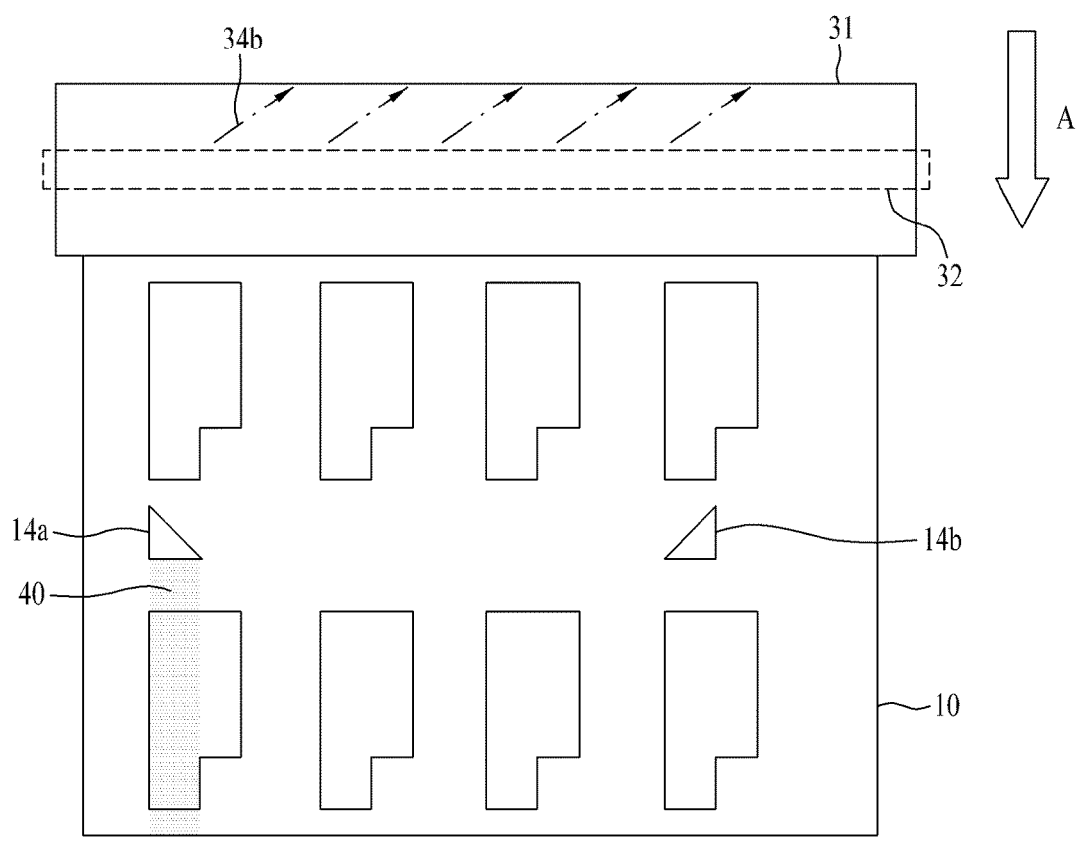
FIG. 9A illustrates a case in which a substrate includes a pattern spacer having an inclined surface parallel to the fibers of the rubbing cloth and a pattern spacer having an inclined surface non-parallel to the fibers of the rubbing cloth.

FIG. 9A illustrates a case in which a rubbing process is performed in a direction (A) using an R-type rubbing cloth, and the substrate includes a first pattern spacer 14a having an inclined surface parallel to the fibers of the L-type rubbing cloth and a second pattern spacer 14b having an inclined surface opposite to the first pattern spacer, that is, an inclined surface parallel to the fibers 34b of the R-type rubbing cloth 31b.

When the rubbing process is performed on the substrate in the direction (A), a region behind the first pattern spacer 14a having an inclined surface parallel to the fibers 34b of the R-type rubbing cloth 31b is normally rubbed.

However, a region behind the second pattern spacer 14b having an inclined surface opposite to the fibers 34a of the L-type rubbing cloth 31 is not normally rubbed, thereby causing a disclination region 40.

Figure 9B:
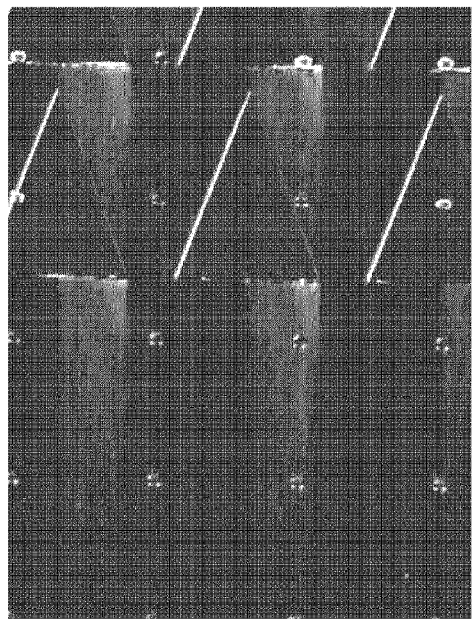
FIG. 9B illustrates the rubbing results of the case of FIG. 9A.
Figure 9B:
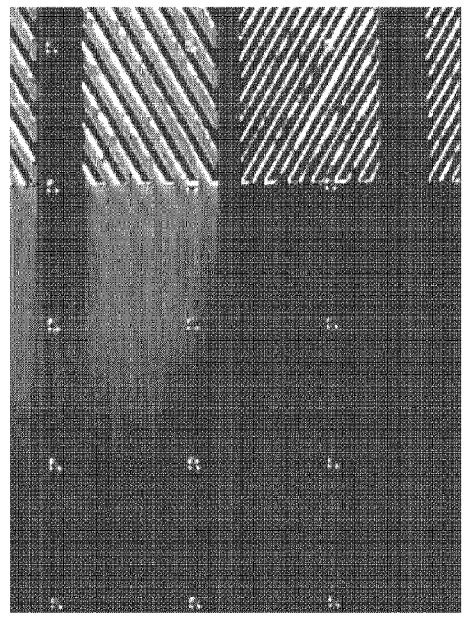

FIG. 9B is a photograph obtained by observing the color filter substrate of the liquid crystal display device rubbed as shown in FIG. 9A using a polarization microscope.

As can be seen from FIG. 9B, a region behind the pattern spacer having an inclined surface parallel to the fibers of the rubbing cloth is normally rubbed without interference with the rubbing cloth. On the other hand, a region behind the pattern spacer having an inclined surface opposite to the fibers of the rubbing cloth is not normally rubbed due to interference between the rubbing cloth and the pattern spacer.

Figure 10:
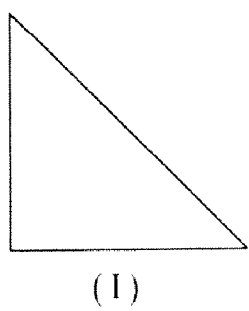
FIG. 10 illustrates the shape of the pattern spacer in the liquid crystal display device according to the embodiment of the present invention.
Figure 10:
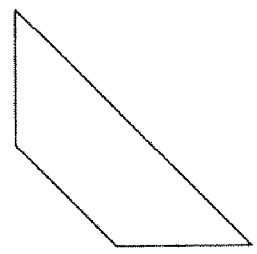
Figure 10:
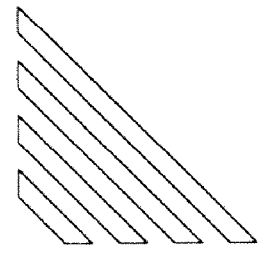

Meanwhile, as shown in FIG. 10, the pattern spacer may be formed in a right-angled triangle (I) having a hypotenuse serving as an inclined surface, a trapezoid (II) having a base serving as an inclined surface, or a pectination (III) having a hypotenuse serving as an inclined surface.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A rubbing method comprising:
    loading a substrate having an alignment layer on a stage; and
    rubbing the substrate using a rubbing cloth having fibers inclined in only one direction of left and right directions with respect to a perpendicular direction of a rotation shaft of a rubbing roll,
    wherein the substrate includes a pattern spacer inclined in a direction parallel to an inclined direction of the fibers.

2. The rubbing method according to claim 1, wherein the fibers of the rubbing cloth are inclined at an angle of 5° to 37°.

3. The rubbing method according to claim 1, wherein the fibers of the rubbing cloth are inclined in a direction opposite to a rubbing direction.

4. A method of fabricating a liquid crystal display device comprising:
    preparing a first substrate and a second substrate;
    forming alignment layers on the first and second substrates;
    rubbing the alignment layers using a rubbing cloth having fibers inclined in only one direction of left and right directions with respect to a perpendicular direction of a rotation shaft of a rubbing roll; and
    bonding the first and second substrates while a liquid crystal layer is interposed between the substrates,
    wherein at least one substrate of the first and second substrates includes a pattern spacer having an inclined surface parallel to the fibers.

5. The method according to claim 4, wherein the fibers of the rubbing cloth are inclined at an angle of 5° to 37°.

* * * * *